United States Patent
Miyakoshi et al.

(10) Patent No.: US 10,078,296 B2
(45) Date of Patent: Sep. 18, 2018

(54) INTERMEDIATE TRANSFER MEMBER FOR IMAGE FORMING APPARATUS, METHOD OF MANUFACTURING THE SAME AND IMAGE FORMING APPARATUS

(71) Applicants: Ryo Miyakoshi, Kanagawa (JP); Hidetoshi Fujii, Kanagawa (JP); Akira Izutani, Osaka (JP); Daisuke Asahina, Kanagawa (JP)

(72) Inventors: Ryo Miyakoshi, Kanagawa (JP); Hidetoshi Fujii, Kanagawa (JP); Akira Izutani, Osaka (JP); Daisuke Asahina, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/609,233

(22) Filed: May 31, 2017

(65) Prior Publication Data
US 2017/0351198 A1 Dec. 7, 2017

(30) Foreign Application Priority Data

Jun. 2, 2016 (JP) .................. 2016-111307

(51) Int. Cl.
| | |
|---|---|
| *G03G 15/16* | (2006.01) |
| *B29C 47/00* | (2006.01) |
| *B29K 71/00* | (2006.01) |
| *B29K 77/00* | (2006.01) |
| *B29K 105/00* | (2006.01) |

(Continued)

(52) U.S. Cl.
CPC ....... *G03G 15/162* (2013.01); *B29C 47/0004* (2013.01); *B29K 2071/02* (2013.01); *B29K 2077/00* (2013.01); *B29K 2105/0023* (2013.01); *B29K 2105/0085* (2013.01); *B29K 2427/16* (2013.01); *B29L 2007/007* (2013.01); *B29L 2031/767* (2013.01); *G03G 2215/00683* (2013.01)

(58) Field of Classification Search
CPC ............ B29C 47/0004; B29K 2071/02; B29K 2077/00; B29K 2105/0023; B29K 2105/0085; B29K 2427/16; B29L 2007/007; B29L 2031/767; G03G 15/162
See application file for complete search history.

(56) References Cited

U.S. PATENT DOCUMENTS 6,652,938 B1 * 11/2003 Nishikawa ............. B65H 5/004
271/18.1
7,629,400 B2 * 12/2009 Hyman .................... B41M 1/30
524/106

(Continued)

FOREIGN PATENT DOCUMENTS

| JP | 2003-195610 | 7/2003 |
| JP | 2011-180206 | 9/2011 |

OTHER PUBLICATIONS

U.S. Appl. No. 15/417,323, filed Jan. 27, 2017.

*Primary Examiner* — Francis C Gray
(74) *Attorney, Agent, or Firm* — Cooper & Dunham LLP (57) ABSTRACT

A member for an image forming apparatus includes a surface layer including a block copolymer, wherein the block copolymer includes a polyamide block and a polyether block and the composition ratio of the polyether block to the polyamide block is from 0.2 to 1.5.

9 Claims, 4 Drawing Sheets

(51) Int. Cl.
*B29L 7/00* (2006.01)
*B29L 31/00* (2006.01)

(56) References Cited

U.S. PATENT DOCUMENTS

| | | | |
|---|---|---|---|
| 8,399,557 B2* | 3/2013 | Montanari | C08L 77/00 |
| | | | 524/538 |
| 2006/0110599 A1* | 5/2006 | Honma | B32B 5/10 |
| | | | 428/413 |
| 2007/0178254 A1* | 8/2007 | Shimomura | G03G 15/0131 |
| | | | 428/32.51 |
| 2007/0232715 A1* | 10/2007 | Hoffmann | C08F 255/00 |
| | | | 522/110 |
| 2008/0069594 A1 | 3/2008 | Izutani | |
| 2008/0069599 A1 | 3/2008 | Nakamura et al. | |
| 2008/0226997 A1 | 9/2008 | Nakamura et al. | |
| 2008/0232849 A1 | 9/2008 | Izutani et al. | |
| 2008/0232864 A1 | 9/2008 | Izutani et al. | |
| 2009/0142107 A1 | 6/2009 | Akira et al. | |
| 2009/0257792 A1 | 10/2009 | Nakamura et al. | |
| 2010/0055603 A1 | 3/2010 | Nozaki et al. | |
| 2010/0272481 A1 | 10/2010 | Yamamoto et al. | |
| 2010/0296848 A1 | 11/2010 | Yamamoto et al. | |
| 2011/0008069 A1 | 1/2011 | Matsushita et al. | |
| 2011/0217653 A1 | 9/2011 | Izutani et al. | |
| 2011/0249994 A1 | 10/2011 | Matsushita et al. | |
| 2012/0065357 A1 | 3/2012 | Yamauchi et al. | |
| 2012/0189951 A1 | 7/2012 | Sugimoto et al. | |
| 2012/0219896 A1 | 8/2012 | Asahina et al. | |
| 2012/0231383 A1 | 9/2012 | Santo et al. | |
| 2012/0237869 A1 | 9/2012 | Chiba et al. | |
| 2012/0294657 A1 | 11/2012 | Matsushita et al. | |
| 2013/0011778 A1 | 1/2013 | Yamashita et al. | |
| 2016/0187816 A1 | 6/2016 | Matsushita et al. | |
| 2016/0202639 A1* | 7/2016 | Matsushita | G03G 15/162 |
| | | | 252/500 |
| 2016/0259273 A1 | 9/2016 | Izutani et al. | |
| 2016/0274500 A1 | 9/2016 | Juri et al. | |

* cited by examiner

INTERMEDIATE TRANSFER MEMBER FOR IMAGE FORMING APPARATUS, METHOD OF MANUFACTURING THE SAME AND IMAGE FORMING APPARATUS

CROSS-REFERENCE TO RELATED APPLICATIONS

This patent application is based on and claims priority pursuant to 35 U.S.C. § 119 to Japanese Patent Application No. 2016-111307, filed on Jun. 2, 2016, in the Japan Patent Office, the entire disclosure of which is hereby incorporated by reference herein.

BACKGROUND

Technical Field

The present invention relates to a member for an image forming apparatus, a method of manufacturing the member for an image forming apparatus, and an image forming apparatus.

Description of the Related Art

Members formed of a semi-conductive resin composition for use in an image forming apparatus employing electrophotography are required to suppress production of defective images and secure anti-filming property.

However, it is difficult to control the resistance of such a member in the semi-conductive area (for example, a volume resistance is about $10^8$ to about $10^{13}$ Ωcm) while securing anti-filming property. In particular, when extruding a thermoplastic resin composition to manufacture a belt, the resistance deviation along the circumferential direction of the belt tends to be large ascribable to a die. A belt having a large resistance deviation invites image defects caused by transfer missing, leak, etc. due to the variation.

SUMMARY

According to an embodiment of the present invention, provided is an improved member for an image forming apparatus including a surface layer including a block copolymer, wherein the block copolymer includes a polyamide block and a polyether block and the composition ratio of the polyether block to the polyamide block is from 0.2 to 1.5.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Next, embodiments are described with reference to drawings. It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Member for Image Forming Apparatus

The member for an image forming apparatus includes a polyamide (hereinafter referred to as PA) block and a polyether (hereinafter referred to as PE) block in its surface layer.

There is no particular limit to the block copolymer. It is possible to use an AB type diblock copolymers, ABA type triblock copolymers, $(AB)_n$ type multiblock copolymers, etc.

There is no particular limit to the molecular structure of the block copolymer. It is possible to use a linear type, a branch type, a cross-linking type, etc.

The block copolymer preferably includes an aliphatic polymer block as the PA block and the PE block in terms of control of the melting point and the resistance value.

The member for an image forming apparatus may employ a single-layered structure (50A in FIG. 4A) formed of the surface layer 51A or a laminated structure (50B in FIG. 4B) of layers (including a surface layer 51B) made of different materials.

Figure 4A:
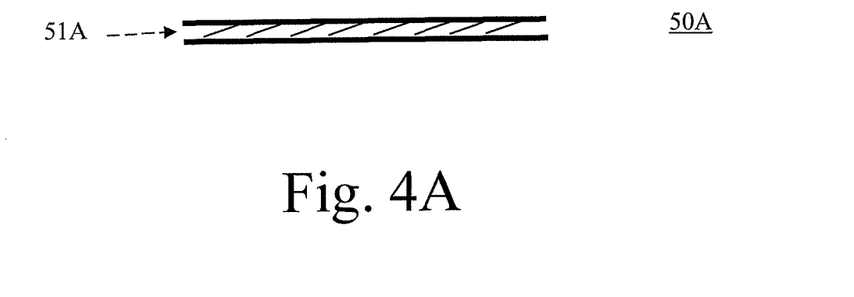
FIG. 4A is a diagram showing an example of a single layer structure for an intermediate transfer member.
Figure 4B:
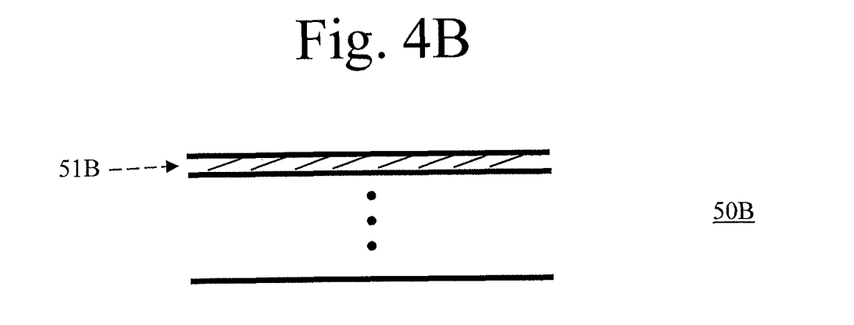
FIG. 4B is a diagram showing an example of a laminated structure of layers for an intermediate transfer member.

As a result of an investigation, the present inventors have found that, in the member for an image forming apparatus including a surface layer (e.g., 51A, 51B, or the like) including a block copolymer including a PE block and the PA block, the composition ratio of the PE block to the PA block in the block copolymer has a correlation with anti-filming property.

It is possible to suppress adherence of inorganic oxides such as $SiO_2$ and $TiO_2$ derived from toner and calcium carbonate and talc derived from recording paper to the surface layer, i.e., filming to improve anti-filming property of the member for an image forming apparatus.

The member for an image forming apparatus is used for an image forming apparatus employing electrophotography method utilizing photoconductive effect and charging phenomenon of a semiconductor, specifically, an intermediate transfer roller, an intermediate transfer belt, a secondary transfer belt, and a sheet conveyor belt.

The composition ratio of the PE block to the PA block in the block copolymer is from 0.2 to 1.5, preferably from 0.2 to 1.0, and furthermore preferably from 0.5 to 1.0. When the composition ratio of the PE block to the PA block in the block copolymer is less than 0.2, the resistance deviation of the surface layer increases. Conversely, when the composition ratio of the PE block to the PA block in the block copolymer is greater than 1.5, filming occurs to the member for an image forming apparatus, degrading anti-filming properly.

The composition ratio of the PE block to the PA block in a diblock copolymer PA-b-PE(-(A')$_n$-(E')$_m$-) represents the molar ratio (m/n) of the repeating unit E' of the PE block to the repeating unit A' of the PA block.

In addition, the composition ratio of the PE block to the PA block in a triblock copolymer PA-b-PE-b-PA(-(A')$_{n1}$-(E')$_m$-(AA')$_{n2}$) represents the molar ratio (m/(n1+n2)) of the repeating unit E' of the PE block to the repeating unit A' of the PA block.

Moreover, the composition of the PE block to the PA block in the multiblock copolymer can be calculated in the same manner as in the diblock copolymer and the triblock copolymer.

The composition of the PE block to the PA block in the block copolymer can be calculated by nuclear magnetic resonance (NMR). Specifically, after a block copolymer or the surface layer is immersed in a deuterated solvent (for example, deuterated hexafluoroisopropanol) in which the block copolymer is soluble and dissolved by ultrasonic, etc., $^1$H-NMR is measured to calculate the composition ratio from the integration values of the repeating unit of a PA block and the repeating unit of a PE unit.

For example, a peak derived from a hydrogen atom bonded with a carbon atom adjacent to a nitrogen atom regarding the PA block and a peak derived from a hydrogen atom bonded with a carbon atom adjacent to an oxygen atom regarding the PE block are used as peaks having no overlapping signals. In this case, from the ratio of the integration value (for 1H) of the peak derived from the hydrogen bond bonded with a carbon atom adjacent to a nitrogen atom and the integration value (for 1H) of the peak derived from the hydrogen bond bonded with a carbon atom adjacent to an oxygen atom, the composition of the PE block copolymer to the PA block in the block copolymer can be obtained.

The PA block and the PE block of the block copolymer can be analyzed by a combinational use of analyzers such as Pyrolysis-Gas Chromatography-Mass Spectroscopy (Py-GC/MS) meter, Liquid Chromatography-Mass Spectrometry (LC-MS) meter, Thermogravimetric analysis/differential thermal analysis (TG/DTA), Differential scanning calorimetry (DSC) measuring, Elemental analyzer (atomic emission detector (AED), Inductively coupled plasma optical emission spectrometry also known as atomic emission spectroscopy (ICP-OES/ICP-AES), and Fourier transform infrared spectrophotometer (FT-IR). It is possible to optionally use an extraction device of solvents in combination.

The block copolymer can be synthesized by a known polymerization method. For example, a block copolymer can be obtained by melting and polymerizing nylon 6 as PA and a polyethylene glycol as PE under the presence of polycarboxylic acid (for example, adipic acid).

In addition, it is also possible to arbitrarily control the melting point of a block copolymer and the composition ratio of the PE block to the PA block in a block copolymer by the identification and the molecular weight of the PA and PE used and the ratio of the PE to the PA.

There is no particular limit to the synthesis method of PA and PE. Known methods can be used.

PA has no particular limit. Specific examples include, but are not limited to, nylon 6, nylon 11, nylon 12, nylon 66, nylon 610, nylon 612, nylon 6T, and nylon 9T. Of these, nylon 6, nylon 11, nylon 610, and nylon 612 are preferable and nylon 6 is more preferable in terms of moldability during extrusion and the resistance deviation of a surface layer.

PE has no particular limit as long as it has multiple ether bonds. Polyalkylene glycol is preferable in terms of melting point and resistance value.

Specific examples include, but are not limited to, polyethylene glycol, polypropylene glycol, and polytetramethylene glycol.

The melting point of the block copolymer is preferably from 200 to 240 degrees C., more preferably from 210 to 230 degrees C., and particularly preferably from 215 to 230 degrees C. When the melting point of the block copolymer is from 200 to 240 degrees C., the moldability during extrusion is improved and the resistance deviation of the surface layer can be further reduced.

The crystallization temperature of the block copolymer is preferably from 150 to 220 degrees C. and more preferably from 180 to 220 degrees C. When the crystallization temperature of the block copolymer is from 180 to 220 degrees C., the resistance deviation of the surface layer can be further reduced.

The proportion of the block copolymer in the surface layer is preferably from 1 to 15 percent by mass and more preferably from 3 to 9 percent by mass. When the proportion of the block copolymer in the surface layer is not less than 1 percent by mass, the resistance deviation of the surface layer can be further reduced. When the proportion of the block copolymer in the surface layer is not greater than 15 percent by mass, anti-filming properly of the member for an image forming apparatus is further improved.

The proportion of the block copolymer in the surface layer can be calculated by extraction operations by various solvents. When the surface layer includes a thermoplastic resin and an electroconductive filler, solubility of the block copolymer and the thermoplastic resin in the surface layer is utilized to isolate the block copolymer and the proportion of the block copolymer in the surface layer is obtained by the mass of the isolated block copolymer. For example, after finely pulverizing a surface layer, a solvent (for example, hexafluoro iropropanol) in which the block copolymer is soluble is added and the block copolymer is extracted by stirring, ultrasonic, etc. Next, the solvent is dried to obtain the proportion of the block copolymer in the surface layer.

The surface layer furthermore preferably includes a thermoplastic resin and an electroconductive filler.

Known thermoplastic resins can be used as the thermoplastic resin.

Specific examples include, but are not limited to, polyvinylidene fluoride (PVDF), polyethylene, polypropylene, polystyrene, thermoplastic polyamide (PA), acrylonitrile-butadiene-styrene (ABS) resin), thermoplastic polyacetal (POM), thermoplastic polyarylate (PAR), thermoplastic polycarbonate (PC), thermoplastic urethane resins, polyethylene naphthalate (PEN), polybutylene naphthalate (PBN), polyalkylene terephthalate, and polyester-based resins. Of these, flame retardant resins having high modulus of elasticity and folding strength are preferable and polyvinylidene fluoride (PVDF) is particularly preferable.

As the electroconductive filler, known electroconductive fillers such as metal oxides, and carbon black are usable. Of these, carbon black is particularly preferable.

Specific examples of the metal oxide include, but are not limited to, zinc oxide, tin oxide, titanium oxide, zirconium oxide, aluminum oxide, and silicon oxide.

In addition, in order to enhance dispersibility, it is suitable to use a metal oxide which is surface-treated in advance.

Specific examples of carbon black include, but are not limited to, Ketjenblack, channel black, furnaces black, acetylene black, thermal black, gas black, black lead, and carbon nanotube. Of these, acetylene black is preferable.

Carbon black has variety of grades according to oxidization treatment for various uses. In embodiments of the present disclosure, various oxidation-treated articles can be utilized.

In addition, in order to enhance dispersibility, it is suitable to use carbon black which is surface-treated in advance.

A specific example of the surface treatment method of carbon black is adding a compound such as a coupling agent having a functional group reactive with a functional group on the surface of carbon black to control acidity or base.

The average primary particle diameter of carbon black is preferably from 10 to 40 nm. Due to such an average primary particle diameter, the change of the resistance of the surface layer to the temperature during extrusion can be small.

The average primary particle diameter of carbon black can be obtained by observing the carbon black with a known electron microscope and obtaining the arithmetical mean particle diameter.

The DBF oil absorption amount of carbon black is preferably 200 $cm^3/100$ g or less. Due to such an average primary particle diameter, the change of the resistance to the temperature during extrusion can be small. This is considered to be a result of enhancement of dispersibility of carbon black in a thermoplastic resin.

The DBF oil absorption amount of carbon black is an amount of dibutylphthalate (DBF) absorbed in 100 g of carbon black and can be measured and calculated according to JIS K6221.

pH of carbon black is preferably 9 or greater. Due to this, the change of the resistance to the temperature during extrusion can be small. This is considered to be a result of enhancement of dispersibility of carbon black in a thermoplastic resin.

A liquid mixture of carbon black and distilled water is measured by a glass electrode pH meter to obtain pH of carbon black.

Method of Manufacturing Member for Image Forming Apparatus

A composition including a block copolymer, a thermoplastic resin, and an electroconductive filler is melt-kneaded and thereafter extruded to manufacture the member for an image forming apparatus.

Below are descriptions of the melt-kneading method and the extrusion method.

Melt-Kneading Method

As the melt-kneading device, known devices such as a double wheel mixer and a continuous single-wheel mixer can be used.

Specific examples of the double wheel mixer include, but are not limited to, KTK type twin-screw extruders (manufactured by KOBE STEEL., LTD.), TEM type twin screw extruders (manufactured by TOSHIBA MACHINE CO., LTD), TEX type twin screw extruders (manufactured by The Japan Steel Works, LTD.), PCM type twin-screw extruders (manufactured by IKEGAI CORP.), and KEX type extruders (manufactured by KURIMOTO, LTD.).

A specific example of the continuous singe-wheel mixer is Co-Kneader (manufactured by COPERION BUSS AG).

It is preferable that a composition melt-kneaded by a melt-kneading machine be processed by a pelletizer to obtain pellets.

In addition, dispersion state of electroconductive fillers changes depending on dispersion conditions. A composition including electroconductive fillers is preliminarily melt-kneaded separately by the identification of the thermoplastic resin and thereafter pelletized and the thus-obtained pellets can be mixed once in order to control dispersibility of the electroconductive filler.

Extrusion Method

The melt-kneaded composition is extruded into a desired form by an extruder.

As the extruder, known extruders can be used. For example, in the case of a member having a cylinder-like form such as an intermediate transfer belt, a cylinder-like form die can be used for extrusion.

Figure 1:
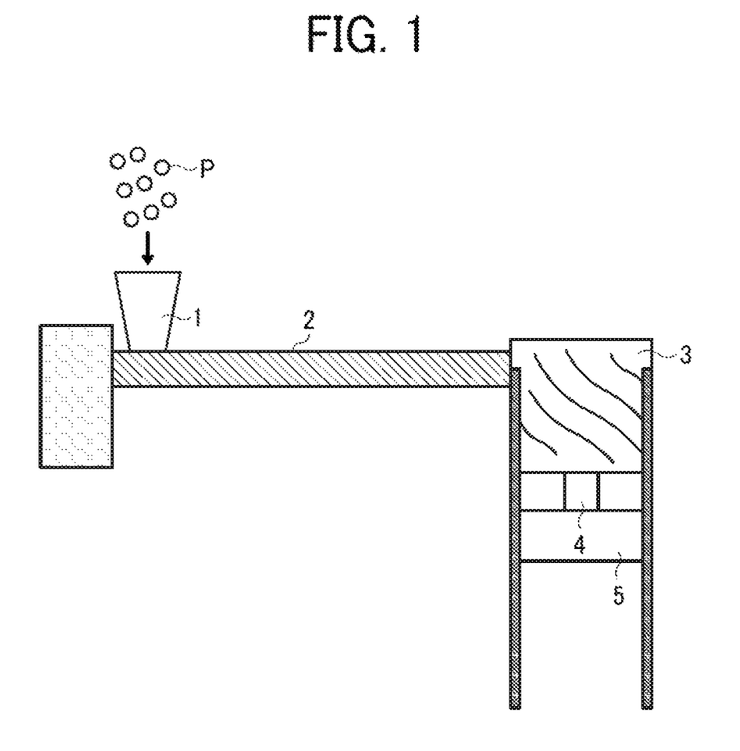
FIG. 1 is a diagram illustrating an example of an extruder.

An example of the extruder is illustrated in FIG. 1.

An example of the extrusion method is described below. A pellet P is charged from a hopper 1 and the temperature of a screw 2 is adjusted in order that a thermoplastic resin is sent into the inside of a die 3 having a cylinder-like form. When the temperature of the die 3 is higher than the melting point of the thermoplastic resin, film having a cylinder-like form is extruded from the die 3. The extruded composition is cooled down in a mandrel 4. The film having a cylinder-like form is extended by a taking-in device 5, rollers disposed inside and outside, etc. to obtain a seamless belt.

A spiral die in which a passage disposed inside is divided into eight, merges, and flows in a spiral manner can be used as the die 3.

As another die 3, it is possible to use a coat hunger die, etc, in which a passage inside is not divided and a composition flows round and merges at one point. Thereafter, the composition flows out of a lip. In addition, a configuration is possible in winch a composition is extruded by passing through an inner core to determine a form and thereafter expanded while the inside and the outside are pinched by rollers, etc.

Image Forming Apparatus and Image Formation Method

The member for an image forming apparatus can be applied to a known image forming apparatus.

The image forming apparatus of the present disclosure includes a photoconductor, a latent electrostatic image forming device, a developing device, a transfer device, and other optional devices.

The image forming apparatus includes the member for an image forming apparatus. It is preferable that the member for an image forming apparatus be an intermediate transfer belt and the transfer device include the intermediate transfer belt.

The image forming method of the present disclosure includes a latent electrostatic image forming process, a development process, a transfer process, and other optional processes.

The image forming method uses the member for an image forming apparatus of the present disclosure. It is preferable that the member for an image forming apparatus be an intermediate transfer belt and the transfer process utilize the intermediate transfer belt.

The image forming method can be suitably conducted by the image forming apparatus. The latent electrostatic image forming process can be suitably conducted by the latent electrostatic image forming device. The development process can be suitably conduced by the developing device. The other optional processes can be suitably conducted by the corresponding other optional devices.

Photoconductor

There is no specific limit to the material, the structure and the size of the photoconductor. The photoconductor can be suitably selected from any known photoconductors. For example, an inorganic photoconductor formed of amorphous silicon or selenium or an organic photoconductor formed of polysilane or phthalopolymethine is suitably used. Of these, amorphous silicon is preferable in terms of long working life.

A photoconductor having a a-Si photoconductive layer formed by heating a substrate at 50 to 400 degrees C. followed by a film-forming method such as a vacuum deposition method, a sputtering method, an ion-plating method, a thermal chemical vapor deposition (CVD) method, optical CVD method, and plasma CVD method. Of these, the plasma CVD method is preferable in which a material gas is decomposed by a direct current, high-frequency, or a microwave glow discharging to form an accumulated film of a-Si on a substrate.

There is no specific limit to the form of a photoconductor and can be suitably selected to suit to a particular application. Cylinder-like forms are preferable.

There is no specific limitation to the outer diameter of a photoconductor having a cylinder-like form is from 3 to 100 mm, preferably from 5 mm to 50 mm, and particularly preferably from 10 to 30 mm.

Latent Image Forming Device and Latent Electrostatic Process

The latent electrostatic image forming device has no particular limit as long as it can form a latent electrostatic image on a photoconductor and can be suitably selected to suit to a particular application. For example, a device including a charger to charge the surface of a photoconductor and an irradiator to irradiate the surface of a photoconductor imagewise is suitable.

The latent electrostatic image forming process has no particular limit as long as it can form a latent electrostatic image on a photoconductor and can be suitably selected to suit to a particular application. For example, the process is conducted by charging the surface of a photoconductor and irradiating the surface imagewise by the latent electrostatic image forming device.

Charger and Charging

There is no specific limit to the selection of the charger and it can be suitably selected to suit to a particular application. Specific examples include, but are not limited to, a known contact type charger including an electroconductive or semi-conductive roller, brush, film, and a rubber blade, and a non-contact type charger using corona discharging such as corotron, and scorotron.

Charging can be conducted by, for example, applying a voltage to the surface of a photoconductor with a charging member.

The charging member may employ any form other than the roller, for example, a magnetic brush, and a fur brush and can be selected according to the specification or form of an image forming apparatus.

When a magnetic brush is used as a charging member, the magnetic brush is formed of a charging member made of, for example, ferrite particles such as Zn—Cu ferrite, a non-magnetic electroconductive sleeve, and a magnet roll disposed inside the non-magnetic electroconductive sleeve.

When a fur brush is used as the charging member, fur electroconductively-treated by carbon, copper sulfide, metal, or metal oxide is used as fur brush material and rolled round or attached to metal or electroconductively treated cored bar to obtain the charging member.

The charging member is not limited to the contact type charging device but is preferably used because such a charging member contributes to manufacturing an image forming apparatus producing less amount of ozone.

Irradiation Device and Irradiation

There is no specific limit to the selection of the irradiation device (irradiator) as long as the surface of a charged photoconductor can be irradiated imagewise and it can be suitably selected to suit to a particular application. Specific examples of such irradiation devices include, but are not limited to, any known irradiation devices such as a photocopying optical system, a rod lens army system, a laser optical system, and a liquid crystal shutter optical system.

The light source for use in the irradiation device has no particular limit and can be suitably selected to suit to a particular application. Specific examples include, but are not limited to, typical luminous materials such as a fluorescent lamp, a tungsten lamp, a halogen lamp, a mercury lamp, a sodium lamp, a light emitting diode (LED), a semiconductor laser (LD), and electroluminescence (EL).

Variety of optical filters can be used to irradiate a photoconductor with beams of light having only a desired wavelength. For example, a sharp cut filter, a band-pass filter, a near infrared filter, a dichroic filter, a coherent filter, and a color conversion filter are suitably used.

Irradiation is conducted by, for example, irradiating the surface of a photoconductor imagewise with the irradiation device.

In the present disclosure, the rear side irradiation system in which a photoconductor is irradiated from the rear side can be also employed.

Developing Device and Development Process

The developing device has no particular limit provided it can develop a latent electrostatic image formed on a photoconductor to render the image visible and can be suitably selected to suit to a particular application.

The development process has no particular limit as long as the process develops a latent electrostatic image formed on a photoconductor with toner to render the image visible and can be suitably selected to suit to a particular application. For example, the development process can be conducted by a developing device.

The developing device may employ a dry-type development system or a wet-type development system. In addition, the developing device may be a single color developing device or multi-color developing device.

The developing device preferably includes a stirrer to stir and triboelectrically charge toner, a magnetic field generator fixed inside, and a rotatable development agent bearing member capable of bearing a development agent including the toner on its surface.

In the developing device, for example, toner and carrier are mixed and stirred to triboelectrically charge the toner. The charged toner stands on the surface of the rotating magnet roller like filaments to form a magnetic brush. Since the magnet roller is provided in the vicinity of a photoconductor, the toner forming the magnet brush borne on the surface of the magnet roller is partially transferred to the surface of the photoconductor by electric attraction force. As a result, the latent electrostatic image is developed with the toner to form a visible toner image on the surface of the photoconductor.

Transfer Device and Transfer Process

The transfer device has no particular limit as long as it can transfer the toner image to a recording medium and can be suitably selected to suit to a particular application. For example, a transfer device is preferable which includes a primary transfer device to transfer visible images onto an intermediate transfer body to form a complex transfer image and a secondary transfer device to transfer the complex transfer image to a recording medium.

The transfer process has no particular limit as long as it can transfer a visible image onto a recording medium and can be suitably selected to suit to a particular application. It is preferable to employ a configuration in which a visible image is primarily transferred to an intermediate transfer body and thereafter secondarily transferred to a recording medium.

The transfer process can be conducted by, for example, charging the photoconductor with a transfer charger by the transfer device.

If an image secondarily transferred to a recording medium is a color image formed of multiple color toners, it is possible to have a configuration in which each color toner image is sequentially overlapped on the intermediate transfer body by the transfer device to form an image thereon, which is secondarily transferred once to a recording medium by an intermediate transfer device.

The intermediate transfer body has no particular limit and can be suitably selected from known transfer bodies to suit to a particular application. For example, an intermediate transfer belt is suitable. The member for an image forming apparatus of the present disclosure can be preferably used as the intermediate transfer body.

The transfer device (the primary transfer device, the secondary transfer device) preferably has a transfer unit which charges the visible image formed on the photoconductor and peels it off to the side of the recording medium.

Specific examples of the transfer unit include, but are not limited to, a corona transfer unit utilizing corona discharging, a transfer belt, a transfer belt, a transfer roller, a pressure transfer roller, and an adhesive transfer device.

The recording medium is typically plain paper but it is possible to use any paper to which a non-fixed image can be transferred after development and the recording medium can be suitably selected to a particular application. PET base for an overhead projector can be also used.

Other Device and Other Process

Examples of the aforementioned other devices include a cleaning device, a discharging device, a recycling device, and a control device.

The other processes include a fixing process, a cleaning process, a discharging process, a recycling process, and a control process.

Fixing Device and Fixing Process

The fixing device has no particular limit provided it can fix a transfer image transferred onto a recording medium and can be suitably selected to suit to a particular application. Known heating and pressure devices are preferable.

A combination of a heating roller and a pressure roller and a combination of a heating roller, a pressure roller, and an endless belt can be used as the heating and pressure device.

The fixing process has no particular limit provided it includes a process of fixing a visible image transferred onto a recording medium and can be suitably selected to suit to a particular application. For example, fixing can be conducted every time each color toner image is transferred or once for a laminated multi-color toner image.

The fixing method can be conducted by a fixing device.

The heating temperature by the pressure and heating device is preferably 80-200 degrees C.

In the present disclosure, for example, any known optical fixing device can be used together with or in place of the fixing device depending on purposes.

There is no specific limitation to the surface pressure in the fixing process and it can be suitably selected to suit to a particular application. Preferably the surface pressure is from 10 to 80 N/cm$^2$.

Cleaning Device and Cleaning Process

There is no specific limitation to the selection of the cleaning device and any known cleaner that can remove the toner remaining on the photoconductor is suitably selected to suit to a particular application. Specific examples of such cleaners include, but are not limited to, a magnetic brush cleaner, an electrostatic brush cleaner, a magnetic roller cleaner, a blade cleaner, a brush cleaner, and a web cleaner.

Any cleaning process that can remove the toner remaining on the photoconductor is suitably used. For example, the cleaning process can be conducted by the cleaning device mentioned above.

Discharging Device and Discharging Process

The discharging device has no particular limit as long as it can apply a discharging bias to a photoconductor for discharging and can be suitably selected to suit to a particular application. For example, a discharging lamp is suitable.

The discharging process has no specific limit as long as it includes applying a discharging bias to a photoconductor for discharging and can be suitably selected to suit to a particular application. For example, the charging process can be conducted by the charging device.

Recycling Device and Recycling Process

The recycling device has no particular limit as long as it recycles toner removed by the cleaning device to the developing device and can be suitably selected to suit to a particular application. For example, known conveying devices are suitable.

The recycling process has no particular limit as long as it includes recycling toner removed in the cleaning process to the development process and can be suitably selected to suit to a particular application. For example, the recycling process can be conducted by the recycling device.

Control Device and Control Process

The control device has no particular limit and any control device as long as it can control the behavior of each device and can be suitably selected to a particular application. For example, devices such as a sequencer and a computer can be used.

The control process has no specific limit as long as it includes controlling the behavior of each process and can be suitably selected to suit to a particular application. For example, the control process can be conducted by the control device.

Figure 2:
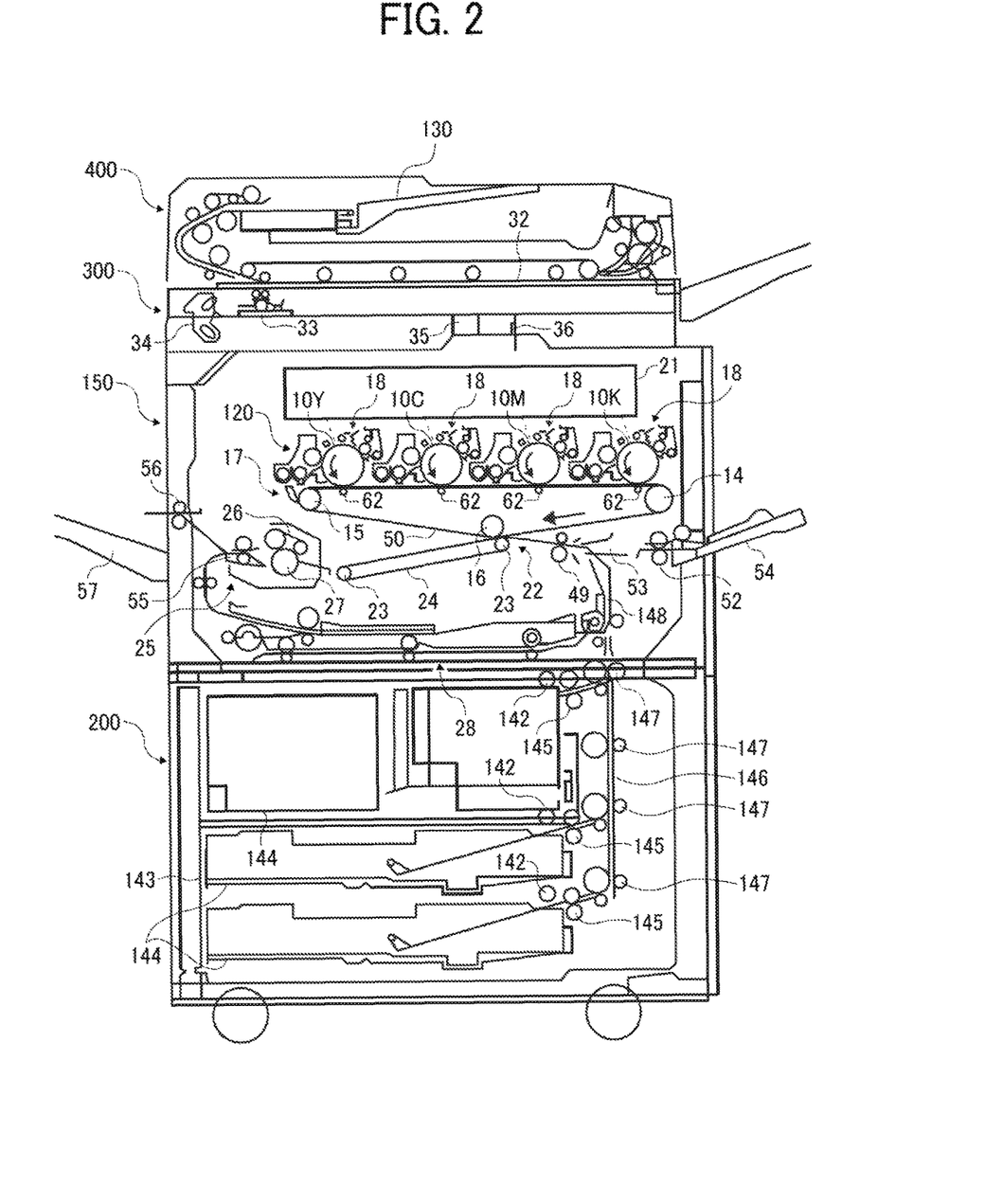
FIG. 2 is a diagram illustrating an example of the image forming apparatus to which the member for an image forming apparatus is applied according to an embodiment of the present disclosure.

FIG. 2 is a diagram illustrating a tandem image forming apparatus as an example of the image forming apparatus to which the member for an image forming apparatus is applied.

The image forming apparatus includes a photocopying unit 150, a sheet feeder table 200, a scanner 300, and an automatic document feeder (ADF) 400.

The photocopying unit 150 of the image forming apparatus has an intermediate transfer belt 50 disposed at the center portion thereof. The intermediate transfer belt 50 is supported by a support rollers 14, 15 and 16 and rotatable clockwise in FIG. 2. A cleaner 17 to remove residual toner on the intermediate transfer belt 50 is disposed around the support roller 15. A tandem developing device 120 including four image forming units 18 of yellow, cyan, magenta and black is disposed along the conveying direction for the intermediate transfer belt 50 supported by the support rollers 14 and 15.

An irradiator 21 is disposed near the tandem developing device 120. A secondary transfer device 22 is disposed on the opposite side of the tandem developing device 120 with the intermediate transfer belt 50 therebetween. In the secondary transfer device 22, a secondary transfer belt 24 is supported by a pair of rollers 23 and a recording medium conveyed on the secondary transfer belt 24 is mutually contactable with the intermediate transfer belt 50. A fixing device 25 is disposed near the secondary transfer device 22. The fixing device 25 includes a fixing belt 26 and a pressure roller 27 pressed against the fixing belt 26.

In addition, in the tandem image forming apparatus, a sheet reverse device 28 to reverse the recording medium to form images on both sides of the recording medium is disposed near the secondary transfer device 22 and the fixing device 25.

Next, the formation of a full color image using the tandem developing device 120 is described. First, a document (original) is set on a document table 130 on the automatic document feeder 400 or the automatic document feeder 400 is opened to set a document on a contact glass 32 for the scanner 300. Thereafter, the automatic document feeder 400 is closed.

When the start button is pressed, the scanner 300 is driven to scan the document on the contact glass 32 with a first scanning unit 33 and a second scanning unit 34 after the document is moved to the contact glass 32 in the case in which the document is set on the automatic document feeder 400 or immediately when the document is set on the contact glass 32. Then, the document is irradiated with light emitted from a light source by the first scanning unit 33 and the reflection light from the document is redirected at the mirror of the second scanning unit 34. The redirected light at the mirror of the second scanning unit 34 passes through air imaging forming lens 35 and is received at a reading sensor 36 to read the document (color image), thereby obtaining black, yellow, magenta and cyan image data.

Each image data for black, yellow, magenta, and cyan is transmitted to each image forming unit 18 (image forming units for black, yellow, magenta, and cyan) in the tandem developing device 120 to form each visible image of black, yellow, magenta, and cyan at each image forming unit 18.

Figure 3:
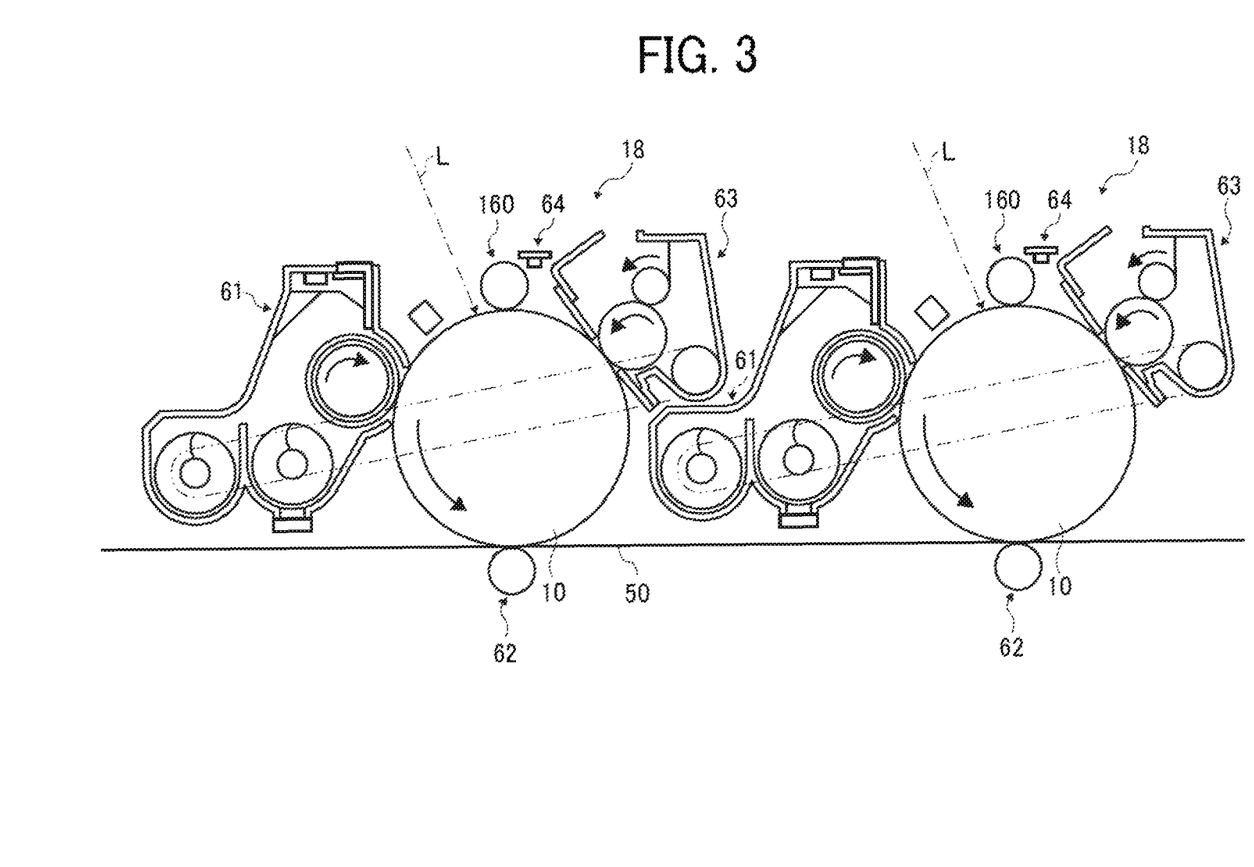
FIG. 3 is an enlarged diagram illustrating the image forming apparatus illustrated in FIG. 2.

As illustrated in FIG. 3, each image forming unit 18 includes a photoconductor 10 (a photoconductor 10K for black, a photoconductor 10Y for yellow, a photoconductor 10M for magenta, and a photoconductor 10C for cyan), a charger 160 to charge the photoconductor 10, and an irradiator to irradiate the photoconductor 10 based on each color image data with light L to form a latent electrostatic image corresponding to each color image on the photoconductor 10. In addition, each image forming unit 18 includes a developing device 61 to develop the latent electrostatic image with each color toner (black toner, yellow toner, magenta toner, and cyan toner) to form a visible image of each color toner, a transfer charger 62 to transfer the visible image to an intermediate transfer belt 50, a cleaner 63, and a discharger 64. Each image forming unit 18 can form each corresponding single color image (black image, yellow image, magenta image, and cyan image) based on each color image data.

The thus-formed black image, yellow image, magenta image, and cyan image respectively on the photoconductor 10K for black, a photoconductor 10Y tor yellow, a photoconductor 10M for magenta and a photoconductor 10C for cyan are sequentially and primarily transferred to the intermediate transfer belt 50 rotationarily moved by the support rollers 14, 15 and 16. Then, the black image, the yellow image, the magenta image, and the cyan image are superimposed on the intermediate transfer belt 50 to form a synthesized color image (color transfer image).

In the sheet feeder table 200, one of the sheet feeder rollers 142 is selectively rotated to bring recording media (sheets) from one of multiple sheet cassettes 144 stacked in a sheet bank 143. A separating roller 145 separates the recording media one by one to feed it into a sheet path 146. Conveyor rollers 147 convey and guide the recording medium to a sheet path 148 in the photocopying unit 150 and the recording medium strikes at a registration roller 49 and is held there.

Alternatively, a sheet feeder roller 142 is rotated to bring up the recording media (sheets) on a bypass tray 54. The recording media are separated one by one by a separating roller 52, conveyed to a manual sheet path 53, and also halted at the registration roller 49. The registration roller 49 is generally grounded but a bias can be applied thereto to remove paper dust on the recording medium.

The registration roller 49 is rotated in synchronization with the synthesized color image (color transfer image) on the intermediate transfer belt 50 to send the recording medium (sheet) between the intermediate transfer belt 50 and the secondary transfer device 22. Thereafter, the synthesized color image (color transfer image) is secondarily transferred to the recording medium to form a color image thereon. The residual toner remaining on the intermediate transfer belt 50 after the image transfer is removed by the cleaner 17.

The recording medium to which the color image is transferred is sent to the fixing device 25 by the secondary transfer device 22 and the synthesized color image (color transfer image) is fixed on the recording medium by heat and pressure at the fixing device 25. Thereafter, the recording medium is switched at a switching claw 55, discharged outside by a discharging roller 56, and stacked on a discharging tray 57. Alternatively, the recording medium is switched by the switching claw 55 and guided to the transfer position again by the sheet reverse device 28 to record another image on the reverse side of the recording medium. Thereafter, the recording medium is discharged by the discharging roller 56 and stacked on the discharging tray 57.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 and 7 and Comparative Examples 1 to 5

A polymer, a thermoplastic resin, and an electroconductive filler were charged and stirred in a HENSCHEL MIXER SPM (manufactured by KAWATAMFG Co., Ltd.) according to the recipe shown in Table 1 to prepare powder. Next, a twin screw mixer (TEM, manufactured by TOSHIBA CORPORATION) was used to melt-knead the powder to obtain pellets. Moreover, the twin screw mixer (TEM, manufactured by TOSHIBA CORPORATION) was used to melt-knead the pellets twice to manufacture pellets of 2 passes.

TABLE 1

| | Polymer | | Thermoplastic resin | | Electro-conductive filler | |
|---|---|---|---|---|---|---|
| | Kind | Proportion (percent by mass) | Kind | Proportion (percent by mass) | Kind | Proportion (percent by mass) |
| Example 1 | U3 | 7.0 | PVDF | 85.5 | CB | 7.5 |
| Example 2 | HD6313 | 7.0 | PVDF | 85.5 | CB | 7.5 |
| Example 3 | HD5513 | 7.0 | PVDF | 85.5 | CB | 7.5 |
| Example 4 | U3 | 0.5 | PVDF | 92.0 | CB | 7.5 |
| Example 5 | U3 | 2.0 | PVDF | 90.5 | CB | 7.5 |
| Example 6 | U3 | 13.0 | PVDF | 79.5 | CB | 7.5 |
| Example 7 | U3 | 20.0 | PVDF | 72.5 | CB | 7.5 |
| Comparative Example 1 | MH1657 | 7.0 | PVDF | 85.5 | CB | 7.5 |
| Comparative Example 2 | NC6321 | 7.0 | PVDF | 85.5 | CB | 7.5 |
| Comparative Example 3 | PA12 | 7.0 | PVDF | 85.5 | CB | 7.5 |
| Comparative Example 4 | — | — | PVDF | 92.5 | CB | 7.5 |
| Comparative Example 5 | P18 | 7.0. | PVDF | 85.5 | CB | 7.5 |

Using a die having a cylinder-like form for melt-kneading extrusion, the pellet of 2 passes was extruded to manufacture a seamless belt having a perimeter of 960 mm and a thickness of 100 μm.

The thickness of the seamless belt can be selected depending on the form of the die having a cylinder-like form and the process conditions. However, it is necessary to adjust the thickness within the range of from 60 to 150 μm suit to a printer on which the seamless belt is set.

Abbreviations in Table 1 represent as follows:
Multi-block Copolymer
U3: IPE U3 (manufactured by IonPhasE Ltd.)
HD6313: Pebax HD6313 (manufactured by ARKEMA)
HD5513: Pebax HD5513 (manufactured by ARKEMA)
P18: Irgastat P18 (manufactured by BASF)
MH1657: Pebax MH1657 (manufactured by ARKEMA)
NC6321: PELESTAT NC6321 (manufactured by Sanyo Chemical Industries, Ltd.)
Polyamide (monopolymer)
PA12: UBESTA (manufactured by Ube Industries, Ltd.)
Thermoplastic Resin
PVDF: polyvinylidene fluoride Kynar 720 (manufactured by ARKEMA)
Electroconductive Filler
CB: DENKA BLACK of particulate acetylene black (manufactured by Denka Company Limited)

Properties of the polymers and thermoplastic resins used are shown in Table 2. Tm, Tc, and Mw respectively represent melting points, crystallization temperatures, and weight average molecular weights.

TABLE 2

| PA Block | PE Block | Composition ratio (PE/PA) | Tm (degrees C.) | Tc (degrees C.) | Mw |
|---|---|---|---|---|---|
| U3 | Nylon 6 | Polyethylene glycol | 0.9 | 220 | 191 | 51,000 |
| HD6113 | Nylon 6 | Polytetramethylene glycol | 0.4 | 213 | 153 | 68,000 |
| HD5513 | Nylon 6 | Polytetramethylene glycol | 1.1 | 200 | 134 | 59,000 |
| P18 | Nylon 12 | Polyethylene glycol | 1.7 | 172 | 142 | 55,000 |
| MH1657 | Nylon 6 | Polyethylene glycol | 2.8 | 205 | 140 | 67,000 |
| NC6321 | Nylon 6 | Polyethylene glycol | 3.4 | 203 | 135 | 56,300 |
| PA12 | Nylon 12 | — | 0 | 180 | 147 | 35,000 |
| PVDF | — | — | — | 168 | 135 | — |

Composition Ratio (PE/PA) of PE Block to PA Block

Utilizing thermal decomposition gas chromatography mass spectrometry (Py-GC/MS) analyzer, PA block and PE block were analyzed based on MS analysis of the detected peaks. In this analysis. QP2010 (manufactured by Shimadzu Corporation) as gas chromatography-mass spectrometry (GC/MS) analyzer, GC-MSsolution (manufactured by Shimadzu Corporation) as data analysis software, and Py2020D as thermal decomposition device were used to make analysis under the following analysis conditions.

Analysis Condition
Thermal decomposition temperature: 400 degrees C.
Column: Ultra ALLOY-5 L=30 m ID=0.25 mm, Film=0.25 μm
Temperature rising condition: 50 degrees C. (held for one minute) to 330 degrees C. (held for 11 minuted) at a temperature rising speed of 10 degrees C./min.
Pressure of carrier gas: 53.6 kPa (constant)
Flow amount of carrier gas: 1.0 mL/min
Ionization method: EI method (70 eV)
Range of mass charge ratio (m/z): 29-700
Infusion mode: Split (1:100)

Next, the composition ratio (PE/PA) was analyzed by a spectrum of $^1$H-NMR. Specifically, a sample of the multi-block copolymer was dissolved in deuterated hexafluoroisopropanol, placed in a NMR sample tube having a diameter of 5 mm, and subject to Fourier transform superconductivity nuclear magnetic resonance (device: JNM-ECX-300, manufactured by JEOL RESONANCE Inc.). The measuring temperature was 30 degrees C. and the number of integration was 256 and the repeating time was 5.0 seconds. The components of the obtained chemical shift were determined and the composition ratio (PE/PA) was calculated by the integration value of the corresponding peaks.

As for the seamless belt, 2.5 g of a sample cut to s strip-like form having a width of 10 mm and 2 g of a deuterated solvent (deuterated hexafluoroisopropanol) were mixed to obtain an extraction liquid. By $^1$H-NMR spectrum of the liquid, the composition ratio (PE/PA) can be analyzed in the same manner.

Tm and Tc

A thermal analyzer Q2000 (manufactured by TA Instruments) was used to measure Tm and Tc under the following analysis condition. The maximum endotherm peak temperature during temperature rising was defined as the melting point (Tm) and the maximum exotherm peak temperature during temperature falling was defined as crystallization temperature (Tc).

Analysis Condition
Sample container: Aluminum sample pan (with a lid)
Sample amount: 5 mg
Reference: Aluminum sample pan (empty container)

Atmosphere: nitrogen (flow amount: 50 ml/min)
Starting Temperature: −20 degrees C.
Temperature rising speed: 10 degrees C./min
Ending temperature: 250 degrees C.
Holding time: 1 min.
Temperature falling speed: 10 degrees C./min
Ending temperature: −50 degrees C.
Mw Using a high speed gel permeation chromatography (GPC) device (HLC-8220GPC, manufactured by TOSOH CORPORATION), Mw was measured under the following analysis condition.

Mw was measured by using the calibration curve obtained by the standard sample of polymethyl methacrylate the molecular weight of which is already known as reference.

In addition, the column used was prepared by serially linking three GMH HR-M (manufactured by TOSOH CORPORATION) with Super H-RC (manufactured by TOSOH CORPORATION).

Analysis Condition
Detector: R1
Measuring Temperature: 40 degrees C.
Transfer phase: hexafluoroisopropanol including 10 mM trifluoro sodium acetate
Flow amount of transfer phase: 0.20 mL/min Thereafter, the resistance deviation and anti-filming property of the seamless belt were evaluated.
Resistance Deviation Using a resistance measuring instrument (Hiresta URS probe, manufactured by Mitsubishi Chemical Analytech Co., Ltd.), the surface resistivity ($\Omega/\square$) of the seamless belt was measured at 32 points spaced 30 mm therebetween along the circumference direction in an environment of 23 degrees C. and 50 percent RH. Next, P-P (peak to peak) [Log ($\Omega/\square$)] of customary logarithm (Log) of the surface resistivity of the seamless belt was calculated as the resistance deviation and evaluated according to the following evaluation criteria. P-P is the value of the difference between the maximum and the minimum of the measuring values of the 32 points.

Evaluation Criteria
A≤0.5
0.5<B≤1.0
1.0<C≤1.5
1.5<D≤2.0
2.0<E

When the resistance deviation of the seamless belt surpasses 1.5 [Log ($\Omega/\square$)] and a seamless belt is used as the intermediate transfer belt of an image forming apparatus employing electrophotography, primary transfer and secondary transfer are not easily conducted at sites having a high surface resistivity of lire seamless belt, which leads to production of defective images.

Anti-filming Property

The seamless belt was mounted onto a printer (MP C2503, manufactured by Ricoh Company Ltd.) as the intermediate transfer belt and a breakdown test of printing on PPC paper (High White A4) was conducted.

Specifically, an image chart having a print ratio of 0.5 percent for each color was printed in the landscape direction with a run length of 10,000 A4 sheets in an environment of 22 to 28 degrees C. and 40 to 60 percent RH.

Using a fluorescent X ray analyzer (ZSX 100e, manufactured by Rigaku Corporation), the seamless belt was subject to qualitative analysis of Si element before and after the breakdown test. Elements of C, N, O, F, Si, and Ca were elected as the qualitative analysis elements. The seamless belt before and after the breakdown test was measured with a diameter of 10 mm to calculate the proportion (percent by mass) of each element.

Thereafter, the attachment amount (percent by mass) of Si was obtained from the relation: (Content of Si alter the breakdown test)−(Content of Si before the breakdown test) and evaluation was made according to the following criteria.

Evaluation Criteria
A≤0.1
0.1<B≤0.2
0.2<C≤0.3
0.3<D≤0.4
0.4<E

When the attachment amount of Si to a seamless belt surpasses 0.3 percent by mass and the seamless belt was used as the intermediate transfer belt of an image forming apparatus employing electrophotography, filming occurs to the seamless belt, thereby causing defects to images.

The evaluation results of the resistance deviation and anti-filming of the seamless belt are shown in Table 3.

TABLE 3

| | Resistance deviation | | Anti-filming | |
| --- | --- | --- | --- | --- |
| | P-P [Log ($\Omega/\square$)] | Proportion (percent by mass) | Kind | Proportion (percent by mass) |
| Example 1 | 0.3 | A | 0.07 | A |
| Example 2 | 0.6 | B | 0.11 | B |
| Example 3 | 0.9 | B | 0.17 | B |
| Example 4 | 1.5 | C | 0.05 | A |
| Example 5 | 1.0 | B | 0.06 | A |
| Example 6 | 0.5 | A | 0.12 | B |
| Example 7 | 0.7 | B | 0.24 | C |
| Comparative Example 1 | 0.7 | B | 0.40 | D |
| Comparative Example 2 | 0.8 | B | 0.44 | E |
| Comparative Example 3 | 1.6 | D | 0.07 | A |
| Comparative Example 4 | 2.8 | E | 0.05 | A |
| Comparative Example 5 | 1.4 | C | 0.32 | D |

As seen in Table 3, the seamless belts of Examples 1 to 7 had small resistance deviations and good anti-filming property.

Since the seamless belt of Comparative Example 1 has a composition ratio (PE/PA) of MH1657 of 2.8, anti-filming property is not good.

Since the seamless belt of Comparative Example 2 has a composition ratio (PE/PA) of NC6321 of 3.4, anti-filming property is not good.

Since the seamless belt of Comparative Example 3 includes PA12, which is polyamide, meaning, a composition ratio (PE/PA) of PA12 of 0, the resistance deviation is large.

Since the seamless belt of Comparative Example 4 includes no block copolymer, the resistance deviation is large.

Since the seamless belt of Comparative Example 5 has a composition ratio (PE/PA) of P18 of 1.7, anti-filming property is not good.

Having now fully described embodiments of the present invention, it will be apparent to one of ordinary skill in the art that many changes and modifications can be made thereto without departing from the spirit and scope of embodiments of the invention as set forth herein.

What is claimed is:

1. An intermediate transfer member for an image forming apparatus, comprising:
a surface layer including a block copolymer,
wherein the block copolymer includes a polyamide block and a polyether block and
wherein a composition ratio of the polyether block to the polyamide block is from 0.2 to 1.5.

2. The intermediate transfer member according to claim 1, wherein the composition ratio is from 0.5 to 1.0.

3. The intermediate transfer member according to claim 1, wherein the block copolymer has a melting point of from 200 to 240 degrees C.

4. The intermediate transfer member according to claim 1, wherein the polyamide block includes at least one member selected from the group consisting of nylon 6, nylon 11, nylon 610, and nylon 612, and wherein the polyether block includes a polyalkylene glycol.

5. The intermediate transfer member according to claim 1, wherein the block copolymer accounts for 1 to 15 percent by mass of the surface layer.

6. The intermediate transfer member according to claim 1, wherein the surface layer further includes a thermoplastic resin and an electroconductive filler.

7. The intermediate transfer member according to claim 6, wherein the thermoplastic resin includes polyvinylidene fluoride.

8. A method of manufacturing the intermediate transfer member of claim 6, comprising:
melt-kneading the composition including the block copolymer, the thermoplastic resin, and the electroconductive filler; and
extruding the composition melt-kneaded.

9. An image forming apparatus comprising:
a photoconductor;
a latent electrostatic image forming device configured to form a latent electrostatic image on the photoconductor;
a developing device configured to develop the latent electrostatic image with toner to form a visible image;
a transfer device configured to transfer the visible image to a recording medium; and
the intermediate transfer member of claim 1.

* * * * *